United States Patent
Wong et al.

(10) Patent No.: US 9,977,998 B2
(45) Date of Patent: May 22, 2018

(54) METHOD AND SYSTEM FOR PROCESSING ONE OR MORE MULTI-CHANNEL IMAGES

(71) Applicant: SONY CORPORATION, Tokyo (JP)

(72) Inventors: Tak Shing Wong, Fremont, CA (US); Jiro Takatori, Tokyo (JP); Xiaogang Dong, Boyds, MD (US)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 14/696,631

(22) Filed: Apr. 27, 2015

(65) Prior Publication Data
US 2016/0314379 A1 Oct. 27, 2016

(51) Int. Cl.
| | |
|---|---|
| *G06K 9/62* | (2006.01) |
| *G06T 7/90* | (2017.01) |
| *G06K 9/46* | (2006.01) |
| *G06K 9/42* | (2006.01) |
| *G06T 7/33* | (2017.01) |

(52) U.S. Cl.
CPC .............. *G06K 9/6276* (2013.01); *G06K 9/42* (2013.01); *G06K 9/4652* (2013.01); *G06K 9/6202* (2013.01); *G06T 7/337* (2017.01); *G06T 7/90* (2017.01); *G06T 2207/10012* (2013.01); *G06T 2207/10024* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 8,687,923 B2 | 4/2014 | Lin et al. | |
| 2009/0141973 A1* | 6/2009 | Wallack | G06K 9/6203 382/165 |
| 2009/0304271 A1* | 12/2009 | Takahashi | G06T 7/0081 382/165 |
| 2010/0177955 A1* | 7/2010 | Simakov | G06F 17/30843 382/154 |

(Continued)

FOREIGN PATENT DOCUMENTS

CN 102665086 A 9/2012

OTHER PUBLICATIONS

Min Chin, et al, "Distance Transforms in Multi Channel MR Image Registration", Proceedings of the Society of Photo-Optical Instrumentation Engineers, Mar. 11, 2011, pp. 1-11.

*Primary Examiner* — Sumati Lefkowitz
*Assistant Examiner* — Jiangeng Sun
(74) *Attorney, Agent, or Firm* — Chip Law Group (57) ABSTRACT

Various aspects of a method and device to process one or more multi-channel images are disclosed herein. The method to process one or more multi-channel images is executed within an electronic device. A channel distance value between each channel of a target patch and corresponding channel of one or more neighbor patches of one or more multi-channel images is determined. The determination of the channel distance value is based on channel data in each channel of the one or more multi-channel images. Based on relative signal information in each channel of the target patch, a channel weight for each channel is dynamically determined. Based on the determined channel distance value and the dynamically determined channel weight for each channel, a patch matching score is determined.

28 Claims, 6 Drawing Sheets

(56) References Cited

U.S. PATENT DOCUMENTS

| | | |
|---|---|---|
| 2011/0199462 A1 | 8/2011 | Nanri et al. |
| 2013/0259360 A1 | 10/2013 | Bingrong et al. |
| 2014/0016863 A1* | 1/2014 | Saxena ............... G06F 17/3025 |
| | | 382/165 |
| 2014/0064614 A1* | 3/2014 | Hung .................... G06T 3/4092 |
| | | 382/167 |
| 2014/0153817 A1* | 6/2014 | Lin .......................... G06K 9/68 |
| | | 382/154 |

* cited by examiner

METHOD AND SYSTEM FOR PROCESSING ONE OR MORE MULTI-CHANNEL IMAGES

FIELD

Various embodiments of the disclosure relate to processing one or more multi-channel images. More specifically, various embodiments of the disclosure relate to processing one or more multi-channel images for patch matching-based applications.

BACKGROUND

Advancements in the field of digital imaging have led to a rapid development of various image processing and computer-vision algorithms to solve classical problems, such as texture synthesis, image filtering and enhancement, image reconstruction, image segmentation, 3D stereo matching and/or motion estimation. Identifying correspondences between image patches by a patch-matching technique may be a core operation in many of these image processing and computer-vision algorithms. Typically, given a target patch in an image, the task is to find one or more neighbor patches which are similar to the target patch. The search scope may be restricted to the same image that contains the target patch, multiple images, or some neighboring regions within such images.

In certain scenarios, the patch matching technique for single channel images may be relatively simple. In such a case, a similarity between two patches may be measured by an appropriate matching cost function based on pixel-wise comparison of the two patches. However, currently, a lot of images captured are multi-channel images. Examples include digital color photography whereby the captured scenes are represented in the R, G, B channels, and multi-spectral imaging which records image data at multiple electromagnetic frequencies. The existing techniques for patch matching may not utilize channel information from all the channels, which may lead to suboptimal processing results.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to process one or more multi-channel images are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various implementations may be found in a method and/or a system to process one or more multi-channel images. The following embodiments are described in sufficient detail to enable those skilled in the art to make and use the disclosed embodiments. While the present disclosure has been described with reference to certain embodiments, it will be understood by those skilled in the art that various changes may be made and equivalents may be substituted without departing from the scope of the present disclosure In the following description, numerous specific details are given to provide a thorough understanding of the disclosure. However, it may be apparent that the disclosed embodiments may be practiced without these specific details. In order to avoid obscuring the present disclosure, some well-known definitions, circuits, system configurations, and process steps are not disclosed in detail.

The drawings showing embodiments of the system are semi-diagrammatic and not to scale and, particularly, some of the dimensions are for the clarity of presentation and are shown exaggerated in the drawings. Where multiple embodiments are disclosed and described having some features in common, for clarity and ease of illustration, description, and comprehension thereof, similar and like features one to another will ordinarily be described with similar reference numerals.

Figure 1A:
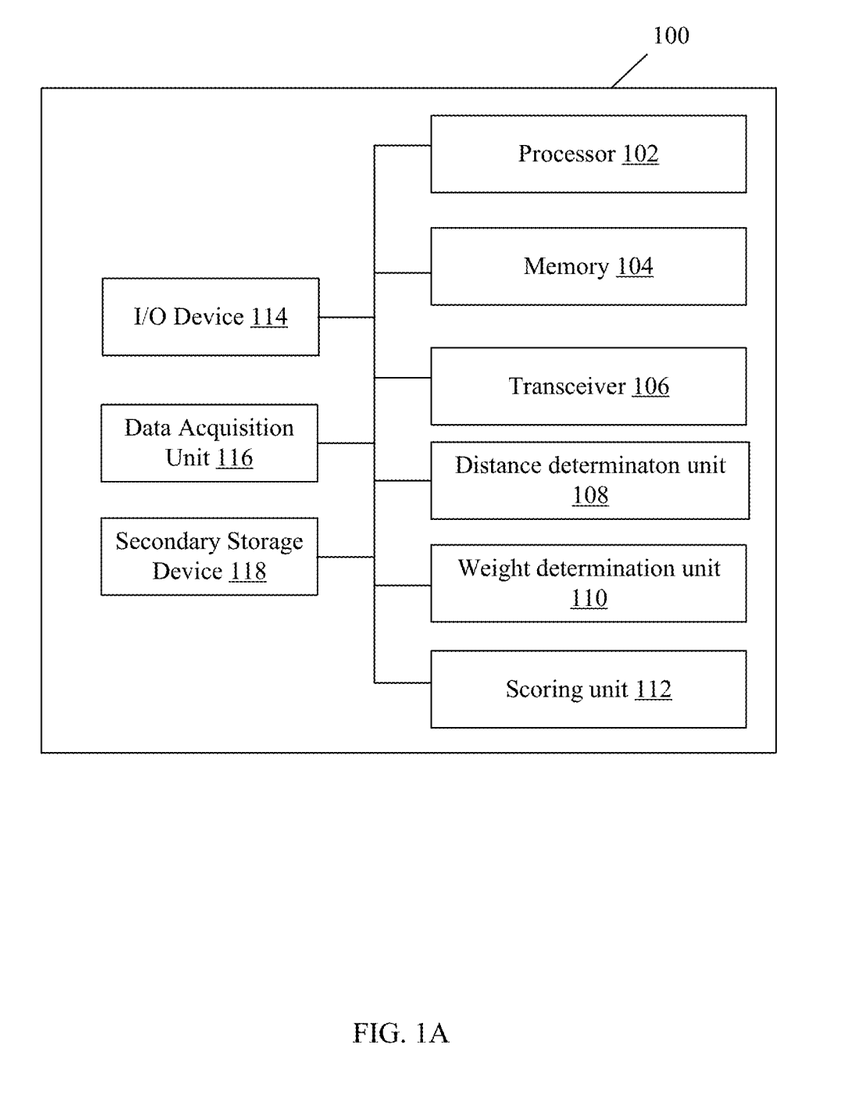
FIG. 1A is a block diagram that illustrates various components of an electronic device utilized to process one or more multi-channel images, in accordance with an embodiment of the disclosure.

FIG. 1A is a block diagram that illustrates various components of an electronic device 100 utilized to process one or more multi-channel images, in accordance with an embodiment of the disclosure. With reference to FIG. 1A, there is shown an electronic device 100. The electronic device 100 may comprise one or more processors, such as a processor 102, a memory 104, a transceiver 106, a distance determination unit 108, a weight determination unit 110, a scoring unit 112, an input/output (I/O) device 114, a data acquisition unit 116, and a secondary storage device 118. The processor 102 may be communicatively coupled to the memory 104, the transceiver 106, the distance determination unit 108, the weight determination unit 110, the scoring unit 112, the data acquisition unit 116, and the secondary storage device 118.

The processor 102 may comprise suitable logic, circuitry, interfaces, and/or code that may be operable to execute a set of instructions stored in the memory 104. The processor 102, in conjunction with the distance determination unit 108, the weight determination unit 110, and the scoring unit 112, may be operable to process one or more multi-channel images. The processor 102 may be implemented based on a number of processor technologies known in the art. Examples of the processor 102 may be an X86-based processor, a Reduced Instruction Set Computing (RISC) processor, an Application-Specific Integrated Circuit (ASIC) processor, a Complex Instruction Set Computing (CISC) processor, and/or other processor.

The memory 104 may comprise suitable logic, circuitry, interfaces, and/or code that may be operable to store the set of instructions, which may be executed by the processor 102. The memory 104 may be further operable to store channel distance values between a target patch (not shown) and one or more neighbor patches (not shown) computed by the distance determination unit 108, in conjunction with the processor 102. The memory 104 may be further operable to store one or more distance computation functions to calculate the channel distance values. The memory 104 may be further operable to store dynamically determined channel weights for each channel determined by the weight determination unit 110. The memory 104 may be further operable to store one or more distance combining algorithms for determination of patch matching scores between the target patch and the one or more neighbor patches, calculated in the scoring unit 112. The memory 104 may be further operable to store the image data and other intermediate and final results of the system. The memory 104 may be implemented in accordance with technologies, such as a Random Access Memory (RAM) and a Read-Only Memory (ROM), known in the art.

The transceiver 106 may comprise suitable logic, circuitry, interfaces, and/or code that may be operable to receive the one or more multi-channel images from external resources, such as a server (not shown), via a communication network (not shown). The transceiver 106 may implement known technologies to support wired or wireless communication with the communication network. The transceiver 106 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 106 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Universal Serial Bus (USB) Protocol, WiMAX, a protocol for email, instant messaging, and/or Short Message Service (SMS).

The distance determination unit 108 may comprise suitable logic, circuitry, interfaces, and/or code that may be operable to determine a channel distance value for each channel between the target patch and a neighbor patch. The distance determination unit 108, in conjunction with the processor 102, may determine the channel distance value based on various mathematical functions that may include, but not limited to, a sum of absolute difference (SAD) function, a sum of squared difference (SSD) function, a weighted sum of absolute difference (WSAD) function, and/or a weighted sum of squared difference (WSSD) function.

The weight determination unit 110 may comprise suitable logic, circuitry, interfaces, and/or code that may be operable to dynamically determine a channel weight for each channel. In accordance with an embodiment, the determined channel weight may be based on relative signal information in each channel with respect to remaining channels in the target patch. In other words, the relative signal information in each channel of the target patch is complementary with respect to remaining channels of the target patch. The weight determination unit 110, in conjunction with the processor 102, may be further operable to normalize the channel weights determined for each channel. In accordance with an embodiment, the determined channel weight may be directly proportional to the relative signal information in the target patch. In accordance with an embodiment, the determined channel weight may be inversely proportional to the noise within each channel of the target patch.

The scoring unit 112 may comprise suitable logic, circuitry, interfaces, and/or code that may be operable to determine a patch matching score for between two patches based on the determined channel distance values and the dynamically determined channel weights. In accordance with an embodiment, the scoring unit 112, in conjunction with the processor 102, may determine the patch matching score based on a convex combination of the determined channel distance values and the dynamically determined channel weights for the channels. The scoring unit 112, in conjunction with the processor 102, may be operable to retrieve one or more mathematical functions for combining the channel distance values from the memory 104. Notwithstanding, other mathematical functions known in the art may also be implemented, without deviating from the scope of the disclosure.

The I/O device 114 may comprise suitable logic, circuitry, interfaces, and/or code that may be operable to receive an input or provide an output to a user. The I/O device 114 may comprise various input and output devices that may be operable to communicate with the processor 102. Examples of the input devices may include, but are not limited to, a keyboard, a mouse, a joystick, a touch screen, a microphone, a camera, and/or a docking station. Examples of the output devices may include, but are not limited to, the display screen and/or a speaker.

The data acquisition unit 116 may comprise suitable logic, circuitry, interfaces, and/or code that may be operable to capture the one or more multi-channel images. The data acquisition unit 116 may comprise one or more imaging sensors to capture the one or more multi-channel images. Examples of the one or more imaging sensors in the data acquisition unit 116 may include, but not limited to, semiconductor charge-coupled device (CCD) or active pixel sensors in complementary metal-oxide-semiconductor (CMOS) or N-type metal-oxide-semiconductor (NMOS, Live MOS) technologies.

The secondary storage device 118 may comprise suitable logic, circuitry, interfaces, and/or code that may be operable to store the one or more multi-channel images. The secondary storage device 118 may receive the one or more multi-channel images from the data acquisition unit 116, the remote data acquisition unit (not shown), or other such image capturing device. In accordance with an embodiment, the secondary storage device 118 may comprise a nonvolatile semiconductor memory in which one or more block areas constituting the nonvolatile semiconductor memory may be used to store the one or more multi-channel images. Examples of the secondary storage device 118 may include, but not limited to, a Hard Disk Drive (HDD), a storage server, a Secure Digital (SD) card, and a flash memory.

In operation, the processor 102 may generate a request for one or more multi-channel images and communicate the request to the transceiver 106. The transceiver 106 may transmit the request to an external source, such as a server (not shown), via a communication network (not shown). Based on the request, the transceiver 106 may receive the requested one or more multi-channel images. In accordance with an embodiment, the server may be a live-streaming server, a content server, and/or an application server. In accordance with an embodiment, the server may be a service provider. In accordance with an embodiment, the server may be associated with a television broadcasting station. The server may be implemented as a single server or as a cluster of servers. The server may be implemented as a cloud server. The server may be implemented based on several technologies that are well known to those skilled in the art.

The communication network may include a medium through which the electronic device 100 and the server may communicate with each other. Such communication may be performed in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols. The communication network may include, but is not limited to, the Internet, a cloud network, a Wireless Fidelity (Wi-Fi) network, a Wireless Local Area Network (WLAN), a Local Area Network (LAN), a Plain Ordinary Telephone Service (POTS), and/or a Metropolitan Area Network (MAN).

In accordance with an embodiment, the processor 102 may be operable to receive the one or more multi-channel images directly from the data acquisition unit 116, such as an image sensor. In accordance with an embodiment, the processor 102 may be operable to receive the one or more multi-channel images from a remote data acquisition unit (not shown), via the communication network. In such a case, the remote data acquisition unit may be communicatively coupled to the electronic device 100. The processor 102 may be further operable to store the received one or more multi-channel images in the memory 104 for further processing.

In accordance with an embodiment, the processor 102 may be operable to retrieve the one or more multi-channel images from the secondary storage device 118, such as a hard disk and a flash memory, to memory 104. The one or more multi-channel images may refer to images where image data are represented in multiple channels. The channels capture different aspects of the scene using different bands of sensing signals or different imaging modalities. Examples of the multi-channel images include, but are not limited to, a digital color photograph, a digital color video, a Bayer sensor raw image, a multi spectral image (that may comprise multiple channels/frequency components), and/or a dual-energy computerized tomography (CT) image. The one or more multi-channel images may contain data of a certain color space, such as sRGB (Official Specification IEC 61966-2-1:1999), YUV (Official Specification ITU-R BT.709-5), and/or the like. The target patch and the one or more neighbor patches may comprise at least a portion of an image from the one or more multi-channel images. Each patch may comprise one or more pixels. Each pixel of the one or more pixels in each patch may comprise one or more components. In accordance with an embodiment, each channel of the target patch and the one or more neighbor patches may comprise a similar component from each pixel of the target patch and the one or more neighbor patches, respectively. The count of channels may be based on a count of one or more components in each pixel. For example, the channels may be a red (R) channel, a blue (B) channel, or a green (G) channel, when each pixel comprises three components, such as a red component, a blue component, and/or a green component.

In accordance with an embodiment, at one time, the processor 102 may be operable to select one target patch from the one or more multi-channel images for processing. The processor 102 may be operable to select each of one or more patches in the one or more multi-channel images, one at a time, as the target patch for processing. The processor 102 may be operable to select each of the patches in the one or more multi-channel images individually for processing. In accordance with an embodiment, the processor 102 may be operable to automatically determine the size and location of the target patch. In accordance with an embodiment, the selection of the target patch may be manual based on a user input. The user input may include size and/or the location of the target patch. In accordance with an embodiment, the target patch of the one or more multi-channel images may comprise one or more pixels. The size and/or the location of the target patch may be determined, based on the area of the one or more multi-channel images and the location of one or more pixels where image processing needs to be implemented. In accordance with an embodiment, the user input may be received via the I/O device 114.

In accordance with an embodiment, every patch in the multi-channel image may be processed one after another. While processing a target patch, such as X, the processor 102 may be operable to determine one or more patches similar to target patch, such as X. In order to determine one or more patches similar to the target patch, the processor 102 may be operable to define a search region surrounding the target patch, such as X. The search region may comprise of a number of neighbor patches. In accordance with an embodiment, the processor 102 may be operable to extract one or more neighbor patches, such as Y(1), Y(2), Y(3), . . . , Y(N) within the search region. For each neighbor patch, the processor 102 may be operable to compute a patch matching score for the pair [X, Y(i)]. The computation of the patch matching score has been described in detail in FIG. 1B and FIG. 2A. The patch matching score may define a degree of similarity between the target patch and one or more neighbor patches. Based on the patch matching score, the processor 102 may be operable to determine top n neighbor patches that may be most similar to the target patch X. Notwithstanding, the processor 102 may be operable to process all the remaining patches in the multi-channel image one by one, similar to the manner as the target patch X is processed, without deviating from the scope of the disclosure.

Figure 1B:
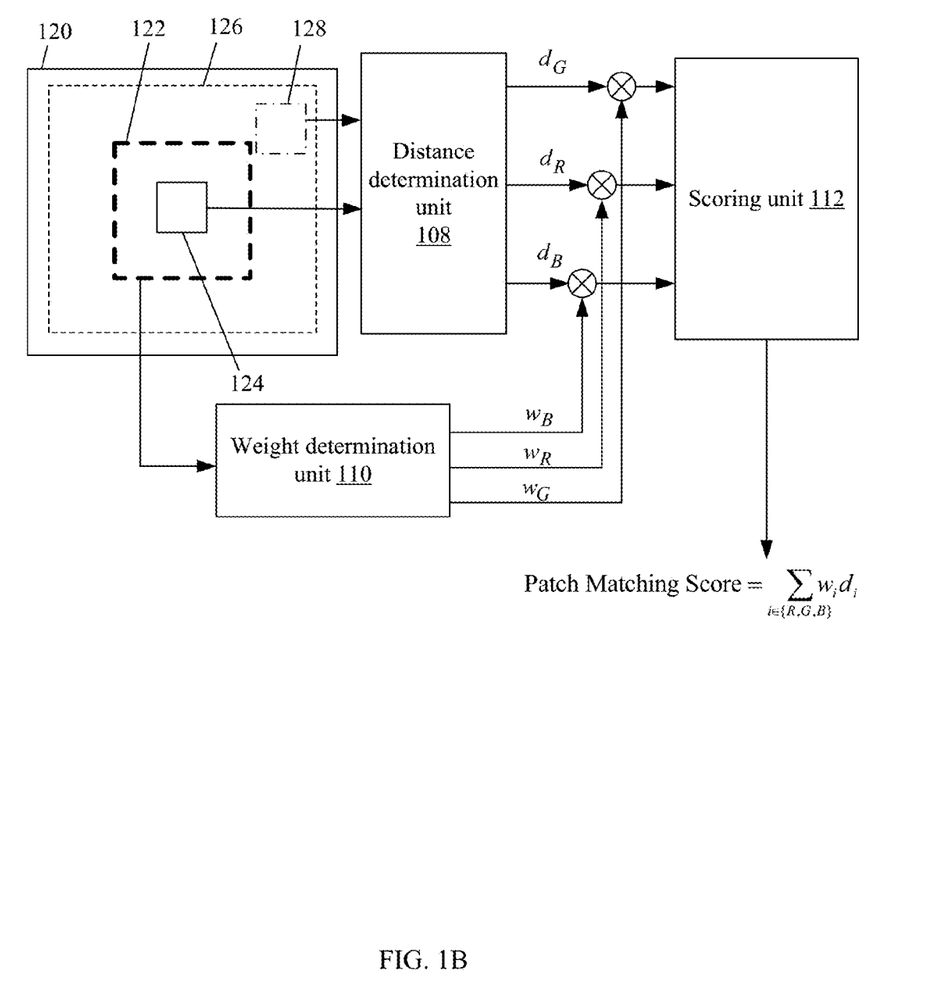
FIG. 1B illustrates a method and system to determine a patch matching score, in accordance with an embodiment of the disclosure.

FIG. 1B illustrates a method and system to determine a patch matching score, in accordance with an embodiment of the disclosure. FIG. 1B is explained in conjunction with elements from FIG. 1A.

In accordance with an embodiment, a multi-channel image 120 may be presented in an exemplary RGB color space. The multi-channel image 120 shows a target patch 124 currently being processed by the processor 102. A local region 122 around the target patch 124 may be utilized to determine the channel weights for the target patch 124. Based on the location of the target patch 124, a square region in the multi-channel image 120, centered at the location of the target patch 124, may be identified as a search region 126. Every neighbor patch, such as 128, within the search region 126 may be extracted and compared with the target patch 124 based on the patch matching scores computed with the disclosed method for each of the neighbor patches, such as 128, in the search region 126. The neighbor patch which has the lowest patch matching score may be utilized to obtain additional information about the target patch 124.

With reference to FIG. 1B, the processor 102 may identify the target patch 124 and the neighbor patch, such as 128. In accordance with the first exemplary scenario, the processor 102, in conjunction with the distance determination unit 108, may determine the channel distance values between one or more channels of the target patch 124 and the corresponding one or more channels of the neighbor patch 128.

Figure 2A:
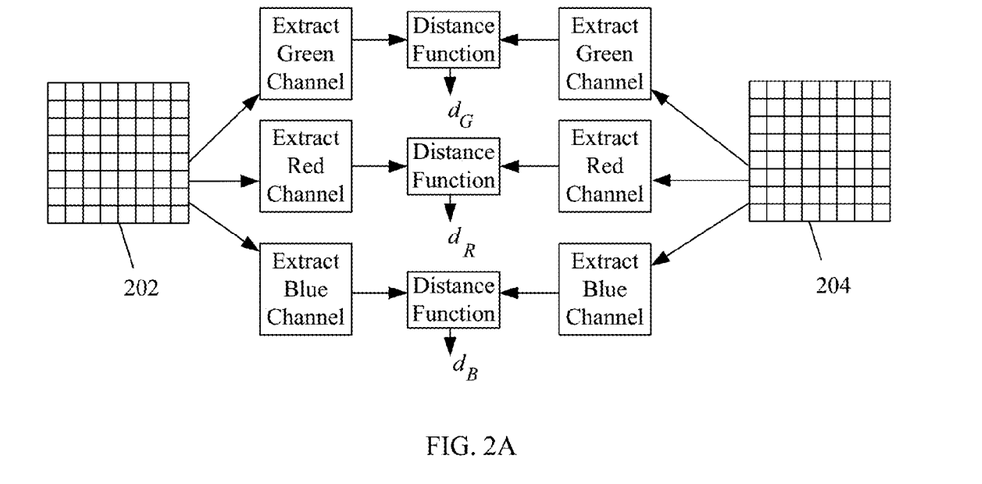
FIG. 2A illustrates a method to determine a channel distance value for each channel, in accordance with an embodiment of the disclosure.

In accordance with the first exemplary scenario, the channel distance values may be computed based on equations (1), (2), (3), or (4) (as explained in FIG. 2A). In accordance with an embodiment, the processor 102 may provide only one neighbor patch, such as 128, as an input to the distance determination unit 108. After computation of the channel distance values for the neighbor patch 128, the processor 102 may compute the channel distance value for the other neighbor patches in the search region 126. Notwithstanding, the processor 102 may further compute the channel distance values for each of the plurality of neighbor patches in a sequence.

In accordance with an embodiment, the processor 102, in conjunction with the weight determination unit 110, may be operable to dynamically determine channel weight for each channel in the target patch 124. In accordance with an embodiment, the local region 122 may be utilized to determine channel weights for the target patch 124. The dynamic determination of the channel weight for each channel may be based on the relative signal information in each channel of the target patch 124. In accordance with an embodiment, the relative signal information in the target patch 124 may be computed based on signal power, noise power, and/or signal-to-noise power ratio of each channel of the target patch 124. The signal power, the noise power, and/or the signal-to-noise power ratio of each channel of the target patch 124 may be based on a local mean and a local variance of each channel of the target patch 124. In accordance with an embodiment, the weight determination unit 110, in conjunction with the processor 102, may be operable to adjust the dynamically determined channel weights when signal information of one or more of the channels change. In accordance with an embodiment, the weight determination unit 110, in conjunction with the processor 102, may determine the channel weights based on a spatially adaptive mechanism.

Figure 2B:
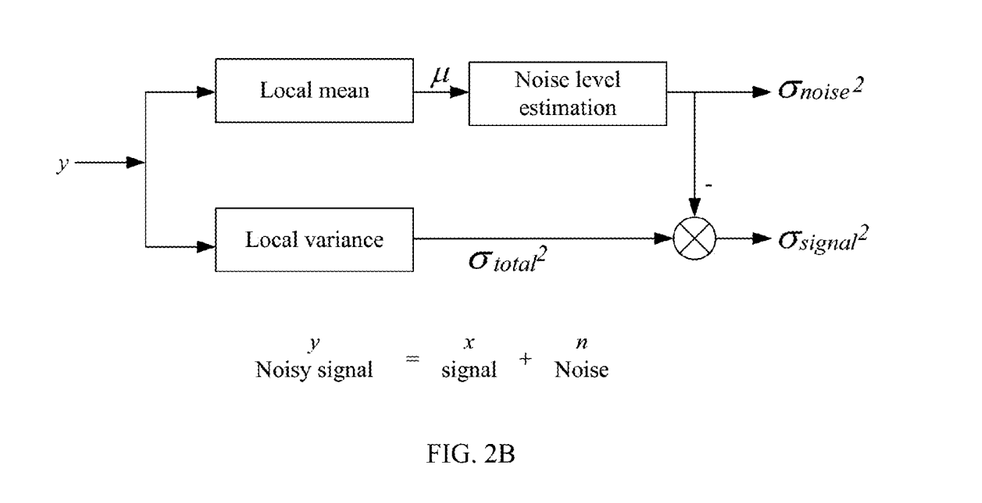
FIG. 2B illustrates a method to estimate a signal power and a noise power in a channel, in accordance with an embodiment of the disclosure

In accordance with an embodiment, the channel weight determined for each channel may be computed in accordance with equation (6) or equation (7) (as explained in FIG. 2B). Based on the determined channel weights and the determined channel distance values, the processor 102, in conjunction with the scoring unit 112, may determine a patch matching score for each of the neighbor patches, for example 128, with respect to the target patch 124. The patch matching score for each of the neighbor patches, such as 128, may be determined in accordance with equation (9), as illustrated in FIG. 2A.

In accordance with an embodiment, the patch matching scores for the neighbor patches, such as 128, in the search region 126 may indicate a degree of similarity between the target patch 124 and the neighbor patch 128. In accordance with an embodiment, the processor 102 may select the neighbor patch 128 with the lowest patch matching score to obtain additional information about the target patch 124.

FIG. 2A illustrates a method to determine a channel distance value for each channel, in accordance with an embodiment of the disclosure. FIG. 2A is explained in conjunction with elements from FIGS. 1A and 1B. The determined channel distance value may quantify a degree of dissimilarity between two patches in the channel. With reference to FIG. 2A, there is shown a target patch 202 and a neighbor patch 204. In accordance with an embodiment, the target patch 202 and the neighbor patch 204 may be extracted from one or more multi-channel images.

In accordance with an embodiment, the processor 102 may extract individual channels, such as R, G, and B channels, from the target patch 202 and the neighbor patch 204, as shown in the FIG. 2A. In accordance with an embodiment, the distance determination unit 108, in conjunction with the processor 102, may determine a channel distance value between the pixels of the target patch 202 and the corresponding pixels of the neighbor patch 204, for each channel. A channel distance value for the R channel, the G channel, and the B channel may be computed in accordance with either one of equations (1), (2), (3) or (4), or any other distance calculation function, known in the art. In accordance with an embodiment, the channel distance values for the R channel, the G channel, and the B channel computed as illustrated in the equation (1):

$$d_{SAD}(p, q) = \sum_{m,n} |p(m, n) - q(m, n)| \quad (1)$$

where, p and q may represent the channel data of the target patch 202 and the neighbor patch 204 respectively, and $d_{SAD}(p,q)$ may represent the sum of absolute difference (SAD) between a channel of the target patch 202 and the corresponding channel in the neighbor patch 204. Further, p(m,n) may represent a pixel component from the target patch 202 and q(m,n) may represent a corresponding pixel component from the neighbor patch 204. For example, for the R channel, the G channel, and the B channel, the equation (1) may compute $d_R$, $d_G$, and $d_B$, respectively. In accordance with an embodiment, the size of the target patch 202 and the neighbor patch 204 may be the same.

In accordance with an embodiment, the channel distance values for the R channel, the G channel, and the B channel, may be computed as illustrated in the equation (2):

$$d_{SSD}(p, q) = \sum_{m,n} |p(m, n) - q(m, n)|^2 \quad (2)$$

where, p and q may represent the channel data of the target patch 202 and the neighbor patch 204 respectively, and $d_{SSD}(p,q)$ may represent the sum of squared difference (SSD) between a channel of the target patch 202 and a corresponding channel in the neighbor patch 204. Further, p(m,n) may represent a pixel component from the target patch 202 and q(m,n) may represent a corresponding pixel component from the neighbor patch 204. For example, for the R channel, the G channel, and the B channel, the equation (2) may compute $d_R$, $d_G$, and $d_B$, respectively. In accordance with an embodiment, the size of the target patch 202 and the neighbor patch 204 may be the same.

In accordance with an embodiment, the channel distance values may be computed as illustrated in the equation (3):

$$d_{WSAD}(p, q) = \sum_{m,n} c(m, n)|p(m, n) - q(m, n)| \quad (3)$$

where, p and q may represent the channel data of the target patch 202 and the neighbor patch 204 respectively, and $d_{WSAD}(p,q)$ may represent the weighted sum of absolute difference (WSAD) between one channel in the target patch 202 and a corresponding channel in the neighbor patch 204. Further, p(m,n) may represent a pixel component from the target patch 202, q(m,n) may represent a corresponding pixel component from the neighbor patch 204, and c(m,n) may represent a weighting factor for each pixel component. For example, for the R channel, the G channel, and the B channel, the equation (3) may compute $d_R$, $d_G$, and $d_B$, respectively. In accordance with an embodiment, the size of the target patch 202 and the neighbor patch 204 may be the same.

In accordance with an embodiment, the channel distance values may be computed as illustrated in the equation (4):

$$d_{WSSD}(p, q) = \sum_{m,n} c(m, n)|p(m, n) - q(m, n)|^2 \quad (4)$$

where, p and q may represent the channel data of the target patch 202 and the neighbor patch 204 respectively, and $d_{WSSD}(p,q)$ may represent the weighted sum of squared difference (WSSD) between one channel in the target patch 202 and a corresponding channel in the neighbor patch 204. Further, p(m,n) may represent a pixel component from the target patch 202, q(m,n) may represent a corresponding pixel component from the neighbor patch 204, and c(m,n) may represent a weighting factor for each pixel component. For example, for the R channel, the G channel, and the B channel, the equation (4) may compute $d_R$, $d_G$, and $d_B$, respectively. In accordance with an embodiment, the size of the target patch 202 and the neighbor patch 204 may be the same.

In accordance with an embodiment, each channel in the target patch 202 may be associated with a channel weight which estimates how much signal information is in the channel. The channel weights for the channels may be determined dynamically based on the actual content in the target patch 202.

In accordance with an embodiment, the weight determination unit 110, in conjunction with the processor 102, may be operable to determine channel weights for each channel of the target patch 202. Each assigned channel weight may be a non-negative numeral (greater than or equal zero), and the channel weights of all channels of the target patch 202 are normalized to sum to one. The normalization of channel weights may be mathematically represented by equation (5):

$$\Sigma w_j = 1 \quad (5)$$

where, $w_j$ may represent the channel weight for channel j, and the summation is over all the channels of the target patch 202.

In accordance with an embodiment, the weight determination unit 110, in conjunction with the processor 102, may be operable to determine a channel weight for each channel of the target patch 202 based on the signal power of the channels. For example, for an image with three channels, labelled as (R,G,B), a channel weight, denoted by $w_R$, for the channel R may be dynamically determined in accordance with equation (6):

$$w_R = \frac{\sigma^2_{signal,R}}{\sum_{j \in \{R,G,B\}} \sigma^2_{signal,j}} \quad (6)$$

where, $\sigma^2_{signal,R}$ may represent the estimated signal power for the channel R, and $\Sigma_{j \in (R,G,B)}$ $\sigma^2_{signal,j}$ may represent summation of the determined signal power for all the channels. Similarly, the channel weights, such as $w_G$ and $w_B$, may be determined for the remaining channels G and B, respectively. Notwithstanding, the disclosure may not be so limited, and channel weights may be determined for the other color spaces, such as YUV, without deviating from the scope of the disclosure.

In accordance with an embodiment, the weight determination unit 110, in conjunction with the processor 102, may be operable to determine the channel weight for each channel of the target patch 202 based on the signal-to-noise power ratio (SNR) of the channels. For example, for an image with n channels, the channel weight for the k-th channel, $w_k$, may be determined in accordance with equation (7):

$$w_k = \frac{SNR_k}{\sum_{i=1}^{n} SNR_i} \quad (7)$$

where, $SNR_i$ may represent the signal-to-noise power ratio for the i-th channel, which is computed in accordance with equation (8):

$$SNR_i = \frac{\sigma^2_{signal,i}}{\sigma^2_{noise,i}} \quad (8)$$

where, $\sigma^2_{signal,i}$ and $\sigma^2_{noise,i}$ are the estimated signal power and estimated noise power for the i-th channel. An embodiment to estimate both the signal power and the noise power in the channel has been described in detail in FIG. 2B.

FIG. 2B illustrates a method to estimate a signal power and a noise power in a channel, in accordance with an embodiment of the disclosure. FIG. 2B is explained in conjunction with elements from FIG. 2A. In accordance with an embodiment, the signal information in a channel may be corrupted due to an internal or an external noise. The processor 102 may be operable to estimate both the signal power and the noise power in the channel. The channel data, y, may comprise signal, x, and noise, n, in an additive noise model, y=x+n. In such a case, the total power in the channel, $\sigma^2_{total}$, is the summation of the channel signal power, $\sigma^2_{signal}$, and the channel noise power, $\sigma^2_{noise}$, i.e. $\sigma^2_{total} = \sigma^2_{signal} + \sigma^2_{noise}$. The total channel power, $\sigma^2_{total}$, may be estimated by computing the sample variance of the data in the channel. In accordance with an embodiment, the channel noise power, $\sigma^2_{noise}$, is a function, called a noise model, of the sample mean of the channel data. The channel noise power, $\sigma^2_{noise}$, may be estimated by computing the sample mean of the channel data, and apply the chosen and calibrated noise model. Both, $\sigma^2_{total}$ and $\sigma^2_{noise}$, may be estimated from the target patch 202 or a larger local region containing the target patch 202.

With regards to FIG. 2A, the selection of the channel weights may be proportional to the estimated signal information for each channel. In accordance with an embodiment, the weight determination unit 110, in conjunction with the processor 102, may be operable to adjust the determined channel weights when signal information of one or more of the channels change. For example, the processor 102 may determine that the R channel comprises more signal information in comparison to the G channel and the B channel. In such a case, the weight determination unit 110, in conjunction with the processor 102, increases the channel weight $w_R$ associated with the R channel. Notwithstanding, the disclosure may not be so limited, such dynamic determination of weights is applicable to other color spaces, such as YUV, without deviating from the scope of the disclosure.

Based on the dynamically determined channel weight for each channel and the determined channel distance values, the scoring unit 112, in conjunction with the processor 102, may generate a patch matching score as a measure of how different or dissimilar are the target patch 202 and the neighbor patch 204. A smaller patch matching score means the two patches are more similar. In accordance with an embodiment, the patch matching score may be computed as a convex combination of the determined channel distance values, scaled by the dynamically determined weights for the channels. If the multi-channel image has n channels, the patch matching score between the target patch 202 and the neighbor patch 204 is given in accordance with equation (9):

$$\text{Patch Matching Score} = \sum_{i \in \{R,G,B\}} w_i d_i \quad (9)$$

where, $w_i$ and $d_i$ are the channel weight and channel distance value, respectively determined for the i-th channel.

Based on the determined patch matching score between the target patch 202 and the neighbor patch 204, the processor 102 may determine a degree of similarity between the target patch 202 and the neighbor patch 204. For each target patch, every neighbor patch within a local search region may be compared to the target patch 202. In an embodiment, the local search region may be a larger region containing the target patch 202 within the same multi-channel image. In another embodiment, the local search region may be a region at the same location in other multi-channel images, for example, in consecutive frame in a video sequence.

In an embodiment, one or more neighbor patches (that includes the neighbor patch 204), may be selected as similar patches of the target patch 202 based on the patch matching scores. The selected similar patches may provide additional information that may be utilized to process the target patch 202.

In accordance with an embodiment, the target patch 202 and the neighbor patch 204 may be similar if the patch matching score is less than a pre-determined threshold value. In such a case, the number of similar patches selected for a target patch 202 is not fixed. For example, the number of neighbor patches in the search region may be k. Thus, the number of similar patches may vary between 0 to k. In accordance with another embodiment, the number of similar patches may be a pre-determined value. In such a case, one or more algorithms, such as a sorting algorithm and/or a searching algorithm, known in the art, may be implemented to determine the similar patches. For example, if the number of pre-determined similar patches is r, the neighbor patches are sorted in increasing order of the corresponding patch matching scores. The first r neighbor patches (with patch matching scores lower than a remaining of the neighbor patches) may be selected as similar patches. Such selection of similar patches may be based on a selection mode. In accordance with an embodiment, the selection mode may be specific to a type of patch matching-based image processing application for which the one or more multi-channel images are processed. The selection mode may correspond to a count of selection of similar patches and an algorithm, such as thresholding, implemented for the selection of similar patches. For example, when the selection mode corresponds to a motion estimation application, only one similar patch with the lowest patch matching score is selected. In accordance with another example, when the selection mode corresponds to a denoising application, one or more similar patches, such as 0 to k neighbor patches or first r neighbor patches (as described above), are selected. In accordance with an embodiment, the selection mode may be fixed when the processing of the one or more multi-channel images is initiated. Notwithstanding, the disclosure may not be so limited and the selection mode may be determined based on other criteria, without deviating from the scope of the disclosure.

Figure 3A:
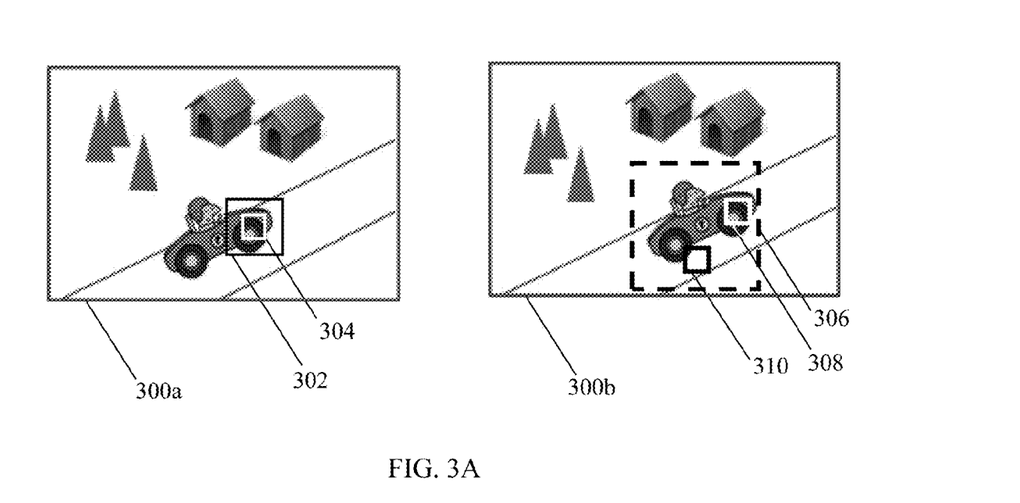
FIGS. 3A and 3B illustrate a first exemplary scenario to implement the disclosed method and system to process two or more multi-channel images, in accordance with an embodiment of the disclosure.
Figure 3B:
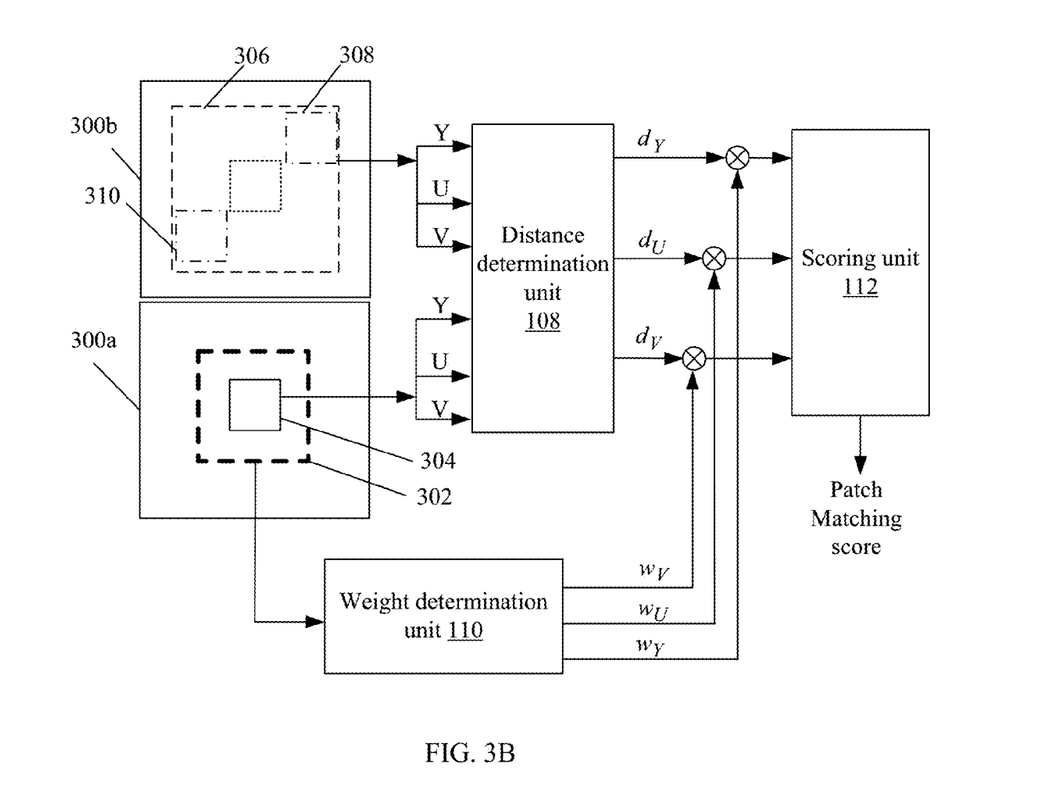

FIGS. 3A and 3B illustrate a first exemplary scenario to implement the disclosed method and system for motion estimation in a video sequence to process two or more multi-channel images, in accordance with an embodiment of the disclosure. The objective of such motion estimation is to identify location of a target patch of an image frame in a next image frame. FIG. 3A and FIG. 3B are explained in conjunction with elements from FIG. 1A and FIG. 1B.

With reference to FIG. 3A, there is shown a first exemplary scenario that comprises two multi-channel images which are two consecutive frames, such as a first image frame 300a and a second image frame 300b, in a video sequence.

In accordance with an embodiment, the two multi-channel image frames may be presented in a YUV color space. The first image frame 300a shows a target patch 304 currently being processed. In the first image frame 300a, a local region 302 around the target patch 304 may be utilized to determine the channel weights for the target patch 304. Based on the location of the target patch 304, a square region in the second image frame 300b, centered at the location of the target patch 304, is identified as a search region 306. Every neighbor patch within the search region 306, two examples being shown as 308 and 310, may be extracted and compared with the target patch 304 based on the patch matching scores computed with the disclosed method for each of the neighbor patches 308 and 310 in the search region 306. The neighbor patch which has the lowest patch matching score may be utilized to locate a new position of the target patch 304 (of the first image frame 300a) in the second image frame 300b.

With reference to FIG. 3B, the processor 102 may identify the target patch 304, and the neighbor patches 308 and 310. In accordance with the first exemplary scenario, the processor 102, in conjunction with the distance determination unit 108, may determine the channel distance values between one or more channels of the target patch 304 in the first image frame 300a, and the corresponding one or more channels of the neighbor patches 308 and 310 in the second image frame 300b.

In accordance with the first exemplary scenario, the channel distance values may be computed based on the equations (1), (2), (3), or (4) (as explained in FIG. 2A). For example, the distance determination unit 108, in conjunction with the processor 102, may determine the channel distance values, $d_Y$, $d_U$, and $d_V$, between one or more channels of the target patch 304 in the first image frame 300a and the corresponding one or more channels of the neighbor patch 308, in the second image frame 300b. Similarly, the distance determination unit 108, in conjunction with the processor 102, may determine the channel distance values (not shown) between one or more channels of the target patch 304 in the first image frame 300a and the corresponding one or more channels of the neighbor patch 310, in the second image frame 300b.

In accordance with an embodiment, the weight determination unit 110, in conjunction with the processor 102, may be operable to dynamically determine a channel weight for each channel in the target patch 304. In accordance with an embodiment, the local region 302 may be utilized to determine channel weights, $w_Y$, $w_U$, and $w_V$, for the target patch 304. The dynamic determination of the channel weight for each channel may be based on the relative signal information in each channel of the target patch 304. In accordance with an embodiment, the weight determination unit 110, in conjunction with the processor 102, may be operable to adjust the dynamically determined channel weights, $w_Y$, $w_U$, and $w_V$, when signal information of one or more of the channels change. In accordance with an embodiment, the weight determination unit 110, in conjunction with the processor 102, may determine the channel weights, $w_Y$, $w_U$, and $w_V$, based on a spatially adaptive mechanism. In accordance with an embodiment, the channel weight determined for each channel may be computed in accordance with equation (6) or equation (7).

Based on the determined channel weights, $w_Y$, $w_U$, and $w_V$, and the determined channel distance values, the processor 102, in conjunction with the scoring unit 112, may determine a patch matching score for each of the neighbor patches, for example 308 and 310, with respect to the target patch 304. The patch matching score for each of the neighbor patches 308 and 310 may be determined in accordance with equation (9).

In accordance with an embodiment, the patch matching scores for the neighbor patches 308 and 310 in the search region 306 may indicate a degree of similarity between the target patch 304 and the neighbor patches 308 and 310. In accordance with an embodiment, the processor 102 may select the neighbor patch 308 with the lowest patch matching score to be the similar patch with respect to the target patch 304. Based on the selected similar neighbor patch 308, the processor 102 may determine a vector difference, known as the motion vector in the art, of the target patch 304, between the position of the target patch 304 in the first image frame 300a and the position of the similar neighbor patch 308 in the second image frame 300b. Notwithstanding, other exemplary scenarios implementing other such applications may be possible, without deviating from the scope of the disclosure.

Figure 4:
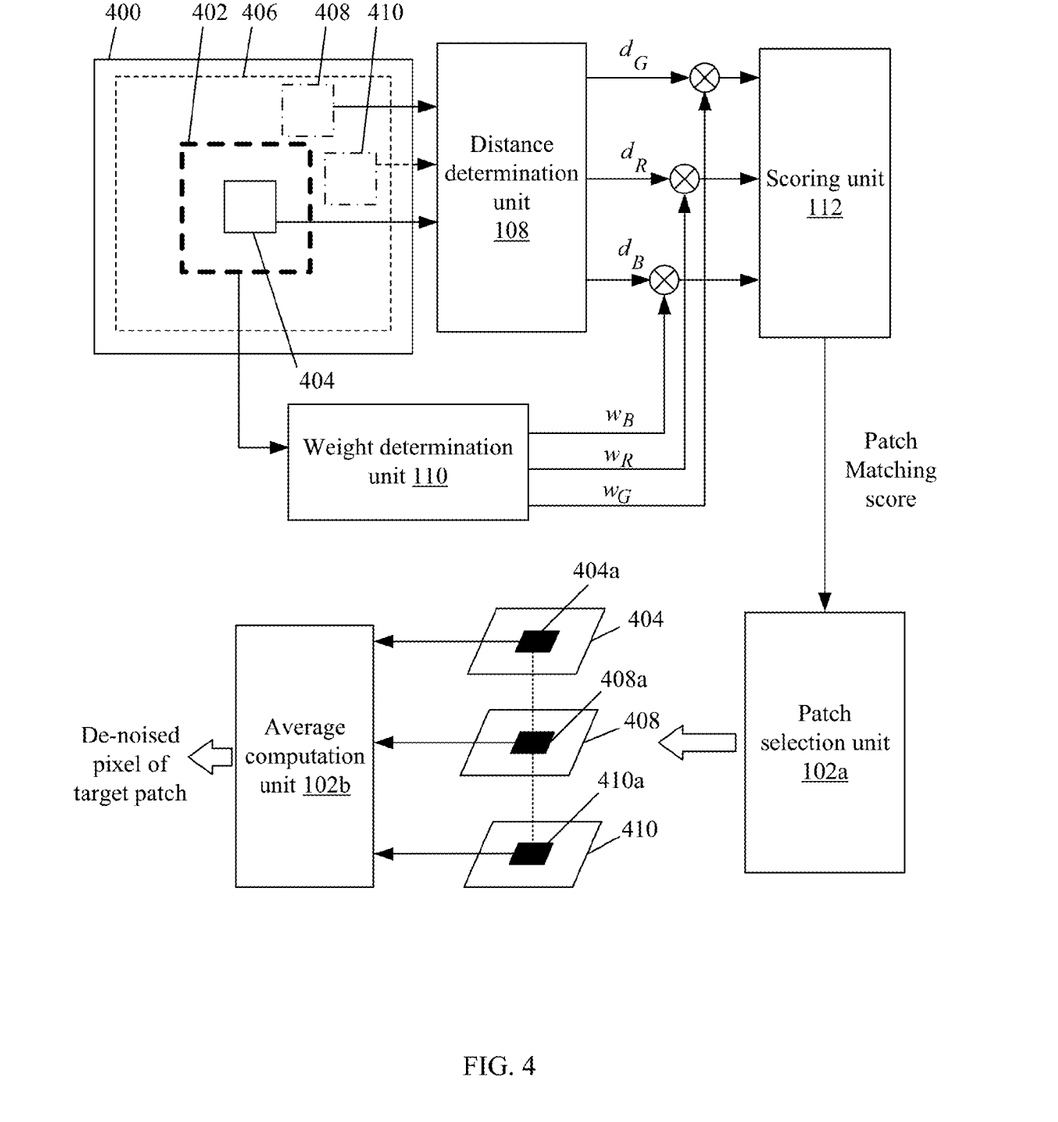
FIG. 4 illustrates a second exemplary scenario to implement the disclosed method and system to process a multi-channel image, in accordance with an embodiment of the disclosure.

FIG. 4 illustrates a second exemplary scenario to implement the disclosed method and system to process a multi-channel image, in accordance with an embodiment of the disclosure. FIG. 4 is explained in conjunction with elements from FIG. 1A and FIG. 1B. With reference to FIG. 4, there is shown a second exemplary scenario that comprises a multi-channel image 400. The multi-channel image 400 may be presented in an RGB color space. The multi-channel image 400 may comprise a target patch 404 which is currently being processed. The processor 102 may determine a local region 402 around the target patch 404, to determine channel weights of each channel of the target patch 404. The processor 102 may automatically select a search region 406 around and centered at the target patch 404. The search region 406 may comprise a plurality of neighbor patches, two examples of them being shown as 408 and 410 that may be automatically selected by the processor 102. In accordance with an embodiment, the processor 102 may provide only one neighbor patch, such as 408, as an input to the distance determination unit 108. After computation of the channel distance values for the neighbor patch 408, the processor 102 may compute the channel distance value for the next neighbor patch 410. Notwithstanding, the processor 102 may further compute the channel distance values for each of the plurality of neighbor patches in a sequence.

With reference to FIG. 4, there is further shown various components of the processor 102, such as a patch selection unit 102a and an average computation unit 102b. The patch selection unit 102a may comprise suitable logic, circuitry, interfaces, and/or code that may be operable to select one or more similar neighbor patches based on the patch matching scores determined by the scoring unit 112. The patch matching scores of such similar neighbor patches may be less than a pre-determined threshold value. In accordance with an embodiment, the patch selection unit 102a may select a pre-determined number of one or more similar neighbor patches. The patch matching scores of each of the pre-determined number of the one or more neighbor patches are lower than a remaining of the one or more neighbor patches. The average computation unit 102b may comprise suitable logic, circuitry, interfaces, and/or code that may be operable to compute pixel-wise averaging across the target patch 404 and one or more of the selected similar neighbor patches.

With reference to FIG. 4, the processor 102 may identify the target patch 404 and the neighbor patches, for example 408 and 410. In accordance with the second exemplary scenario, the processor 102, in conjunction with the distance determination unit 108, may determine the channel distance values between one or more channels of the target patch 404 in the multi-channel image 400, and the corresponding one or more channels of each of the neighbor patches 408 and 410.

In accordance with the second exemplary scenario, the channel distance values may be computed based on equations (1), (2), (3), or (4) (as explained in FIG. 2A). For example, the channel distance values between one or more channels of the target patch 404 and the corresponding one or more channels of the neighbor patch 408, may be computed as $d_R$, $d_G$, and $d_B$. For simplicity, only the channel distance values, $d_R$, $d_G$, and $d_B$, for the neighbor patch 408 have been illustrated in the FIG. 3B.

In accordance with an embodiment, the weight determination unit 110, in conjunction with the processor 102, may be operable to dynamically determine channel weights, $w_R$, $w_G$, and $w_B$, for all channels in the target patch 404. In accordance with an embodiment, the weight determination unit 110 may determine the channel weights, $w_R$, $w_G$, and $w_B$, based on a spatially adaptive mechanism. The dynamic determination of channel weight for each channel may be based on the relative signal information in each channel of the target patch 404. In accordance with an embodiment, the weight determination unit 110, in conjunction with the processor 102, may be operable to adjust the dynamically determined channel weights, $w_R$, $w_G$, and $w_B$, when signal information of one of the channels changes. In accordance with an embodiment, the channel weights, $w_R$, $w_G$, and $w_B$, may be dynamically adjusted based on the relative importance of the channels in the local region 402. In accordance with an embodiment, the channel weight determined for each channel may be computed as in equation (6) or equation (7).

Based on the determined channel weights, $w_R$, $w_G$, and $w_B$, and the determined channel distance values, the processor 102, in conjunction with the scoring unit 112, may determine a patch matching score for each of the neighbor patches, for example 408 and 410. The patch matching score for each of the neighbor patches 408 and 410 may be determined in accordance with equation (9).

In accordance with an embodiment, the patch matching scores of the neighbor patches in the search region 406 may signify a degree of similarity between the target patch 404 and the neighbor patches, for example 408 and 410. The patch selection unit 102a may select one or more neighbor patches as similar patches based on the patch matching scores determined by the scoring unit 112, in conjunction with the processor 102. In accordance with an embodiment, the patch selection unit 102a may select the one or more neighbor patches as similar patches, whose patch matching scores are less than a pre-determined threshold value. In accordance with another embodiment, the patch selection unit 102a may sort the neighbor patches in an increasing order of corresponding patch matching scores. The patch selection unit 102a may further select a pre-determined number of one or more neighbor patches whose patch matching scores are lower than a remaining of the one or more neighbor patches.

In accordance with an embodiment, after selecting the similar patches by the patch selection unit 102a, the average computation unit 102b may compute the average of the center pixel value of the target patch 404 and the center pixel value of all the selected similar patches. The computed average of the center pixel value of the target patch 404 and the center pixel value of all the selected similar patches may be used as a denoised center pixel of the target patch 404 in the output image. Notwithstanding, other exemplary scenarios implementing other applications may be possible, without deviating from the scope of the disclosure.

Notwithstanding, the disclosure may not be so limited, and other pixels of the target patch 404 may be identified as center pixels for other target patches. Accordingly, the other pixels of the target patch 404 may be denoised, based on computed average with the one or more center pixels of neighbor patches, without deviating from the scope of the disclosure.

Figure 5:
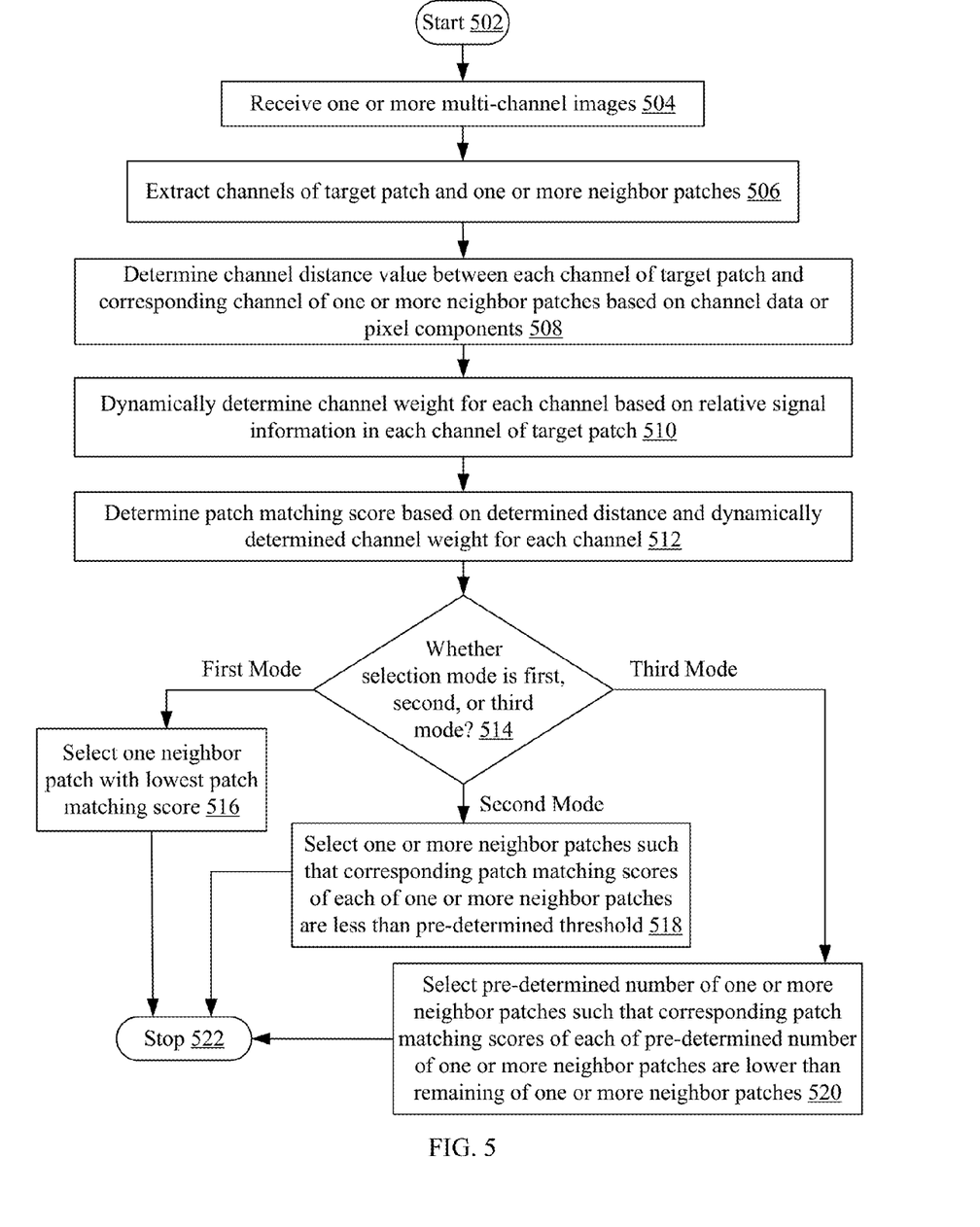
FIG. 5 is a flow chart that illustrates a method to process one or more multi-channel images, in accordance with an embodiment of the disclosure.

FIG. 5 is a flow chart that illustrates a method to process one or more multi-channel images, in accordance with an embodiment of the disclosure. FIG. 5 is described in conjunction with elements of FIG. 1A to FIG. 4. With reference to FIG. 5, there is shown a flowchart that corresponds to the method that may be implemented in the electronic device 100.

The flowchart begins at step 502 and proceeds to step 504. At step 504, the one or more multi-channel input images may be received. At step 506, the channels within the target patch and the one or more neighbor patches may be extracted. At step 508, channel distance value between each channel of target patch and corresponding channel of one or more neighbor patches may be determined based on the channel data. In an embodiment, the channel distance value may be determined based on the pixel components from the target patch and the corresponding pixel components from the one or more neighbor patches.

At step 510, channel weight for each channel may be determined based on the relative signal information in each channel of the target patch. At step 512, the patch matching score for each pair of the target patch and the one or more neighbor patches may be determined based on the channel distance values and the channel weight. At step 514, it may be determined whether the selection mode for selection of the one or more neighbor patches a first mode, a second mode, or a third mode. In an instance, when the selection mode for the selection of the one or more neighbor patches is the first mode, the control passes to step 516. In an instance, when the selection mode for the selection of the one or more neighbor patches is the second mode, the control passes to step 518. In an instance, when the selection mode for the selection of the one or more neighbor patches is the third mode, the control passes to step 520. In an instance, when the selection mode for the selection of the one or more neighbor patches is none of the first mode, the second mode, and the third mode, the control passes directly to end step 522 (not shown in FIG. 5).

At step 516, when the selection mode for the selection of the one or more neighbor patches is the first mode, only one of the one or more neighbor patches with the lowest corresponding patch matching score, is selected. The control passes to end step 522.

At step 518, when the selection mode for the selection of the one or more neighbor patches is the second mode, the one or more neighbor patches with the determined corresponding patch matching scores less than a pre-determined threshold value, are selected. The control passes to end step 522.

At step 520, when the selection mode for the selection of the one or more neighbor patches is the third mode, the predetermined number of one or more neighbor patches with the determined corresponding patch matching scores lower than a remaining of the one or more neighbor patches, are selected. The control passes to end step 522.

In accordance with an embodiment of the disclosure, a system to process one or more multi-channel images may comprise the electronic device 100 (as shown in FIG. 1A). The electronic device 100 may be communicatively coupled to the server, via the communication network. The electronic device 100 may comprise one or more processors, such as the processor 102 (as shown in FIG. 1A), the distance determination unit 108 (as shown in FIG. 1A), the weight determination unit 110 (as shown in FIG. 1A), and the scoring unit 112 (as shown in FIG. 1A). The distance determination unit 108 may be operable to determine the channel distance value between each channel of the target patch and the corresponding channel of the one or more neighbor patches based on channel data in each channel of the one or more multi-channel images. The weight determination unit 110 may be further operable to dynamically determine channel weights for each channel, based on relative signal information in each channel of the target patch of the multi-channel input image. The scoring unit 112 may be further operable to determine a patch matching score based on the determined channel distance value and the dynamically determined channel weight for each channel.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to process one or more multi-channel images. The at least one code section in an electronic device may cause the machine and/or computer to perform the steps, which may comprise determination of a channel distance value between each channel of a target patch and a corresponding channel of one or more neighbor patches based on channel data in each channel of the one or more multi-channel images. Based on relative signal information in each channel of the target patch of the multi-channel input image, channel weights may be determined dynamically for each channel. Based on the determined channel distance value and the dynamically determined channel weight for each channel, a patch matching score may be determined.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for processing one or more multi-channel images, the method comprising:
   in an electronic device:
   determining a channel distance value between each channel of a target patch and a corresponding channel of one or more neighbor patches based on channel data in said each channel of said one or more multi-channel images;
   dynamically determining a channel weight for said each channel based on relative signal information in said each channel of said target patch;
   updating said dynamically determined channel weight based on a change in the relative signal information for said each channel;
   determining a patch matching score based on said determined channel distance value and said dynamically determined channel weight for said each channel;
   selecting at least one neighbor patch of said one or more neighbor patches based on corresponding said determined patch matching score of said at least one neighbor patch; and
   denoising said target patch based on said selected at least one neighbor patch.

2. The method of claim 1, wherein said target patch comprises one or more pixels, wherein each pixel of said one or more pixels comprises one or more components.

3. The method of claim 1, wherein said each channel of said target patch and said one or more neighbor patches comprise a similar component from each pixel of said target patch and said one or more neighbor patches, respectively.

4. The method of claim 1, wherein said relative signal information in said each channel of said target patch is complementary with respect to remaining channels of said target patch.

5. The method of claim 1, further comprising selecting said one or more neighbor patches based on said corresponding patch matching scores as determined less than a threshold value.

6. The method of claim 1, further comprising selecting a number of said at least one neighbor patch of said one or more neighbor patches,
   wherein corresponding patch matching scores of each of said number of said at least one neighbor patch are lower than a remaining of said one or more neighbor patches.

7. The method of claim 6, further comprising computing an average of a first center pixel of said target patch and one or more second center pixels of said selected at least one neighbor patch.

8. The method of claim 7, wherein said denoising on said target patch is further based on said averaging.

9. The method of claim 1, wherein said target patch and said one or more neighbor patches comprise at least a portion of an image from said one or more multi-channel images.

10. The method of claim 1, further comprising determining a first image and a consecutive second image from said one or more multi-channel images, wherein said first image comprises said target patch and said consecutive second image comprises said one or more neighbor patches.

11. The method of claim 1, further comprising selecting one of said one or more neighbor patches with a lowest patch matching score.

12. The method of claim 11, further comprising computing a vector difference between said target patch and said selected one or more neighbor patches.

13. The method of claim 12, further comprising determining motion vector of said target patch based on said computed vector difference.

14. The method of claim 1, wherein said determination of said channel distance value is based on one of a sum of absolute difference (SAD) function, a sum of squared difference (SSD) function, a weighted sum of absolute difference (WSAD) function, or a weighted sum of squared difference (WSSD) function.

15. The method of claim 1, further comprising normalizing said dynamically determined channel weights for said each channel.

16. The method of claim 1, further comprising computing said relative signal information in said target patch based on signal power, noise power, or signal-to-noise power ratio of said each channel of said target patch.

17. The method of claim 16, wherein said signal power, said noise power, or said signal-to-noise power ratio of said each channel of said target patch is based on a local mean or a local variance of said each channel of said target patch.

18. A system to process one or more multi-channel images, the system comprising:
one or more processors operable to:
determine a channel distance value between each channel of a target patch and a corresponding channel of one or more neighbor patches based on channel data in said each channel of said one or more multi-channel images;
dynamically determine a channel weight for said each channel based on relative signal information in said each channel of said target patch;
update said dynamically determined channel weight based on a change in the relative signal information for said each channel;
determine a patch matching score based on said determined channel distance value and said dynamically determined channel weight for said each channel;
select at least one neighbor patch of said one or more neighbor patches based on corresponding said determined patch matching score of said at least one neighbor patch; and
denoise said target patch based on said selected at least one neighbor patch.

19. The system of claim 18, wherein said one or more processors are further operable to select said one or more neighbor patches based on said corresponding patch matching scores as determined less than a threshold value.

20. The system of claim 18,
wherein said one or more processors are further operable to select a number of said at least one neighbor patch of said one or more neighbor patches, and
wherein corresponding patch matching scores of each of said number of said at least one neighbor patch are lower than a remaining of said one or more neighbor patches.

21. The system of claim 20, wherein said one or more processors are further operable to compute an average of a first center pixel of said target patch and one or more second center pixels of said selected at least one neighbor patch.

22. The system of claim 21, wherein said one or more processors are further operable to denoise said target patch based on said computed average.

23. The system of claim 18, wherein said target patch and said one or more neighbor patches comprise at least a portion of an image from said one or more multi-channel images.

24. The system of claim 18, wherein said one or more processors are further operable to determine a first image and a consecutive second image from said one or more multi-channel images,
wherein said first image comprises said target patch and said consecutive second image comprises said one or more neighbor patches.

25. The system of claim 24, wherein said one or more processors are further operable to select one of said one or more neighbor patches with a lowest patch matching score.

26. The system of claim 25, wherein said one or more processors are further operable to compute a vector difference between said target patch and said selected neighbor patch.

27. The system of claim 26, wherein said one or more processors are further operable to determine a motion vector of said target patch based on said computed vector difference.

28. A non-transitory computer-readable medium having stored thereon, computer-executable instructions for causing a computer to execute operations, the operations comprising:
determining a channel distance value between each channel of a target patch and a corresponding channel of one or more neighbor patches based on channel data in said each channel of said one or more multi-channel images;
dynamically determining a channel weight for said each channel based on relative signal information in said each channel of said target patch;
updating said dynamically determined channel weight based on a change in the relative signal information for said each channel; and
determining a patch matching score based on said determined channel distance value and said dynamically determined channel weight for said each channel
selecting at least one neighbor patch of said one or more neighbor patches based on corresponding said determined patch matching score of said at least one neighbor patch; and
denoising said target patch based on said selected at least one neighbor patch.

* * * * *